United States Patent
Dai et al.

(10) Patent No.: US 9,060,304 B2
(45) Date of Patent: Jun. 16, 2015

(54) RADIO FRAME AND SOUNDING REFERENCE SIGNAL SENDING METHOD IN MOBILE COMMUNICATION SYSTEM

(75) Inventors: Bo Dai, Shenzhen (CN); Peng Hao, Shenzhen (CN); Yuxin Wang, Shenzhen (CN); Chunli Liang, Shenzhen (CN); Bin Yu, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 317 days.

(21) Appl. No.: 13/635,981

(22) PCT Filed: Dec. 29, 2010

(86) PCT No.: PCT/CN2010/080441
§ 371 (c)(1),
(2), (4) Date: Sep. 19, 2012

(87) PCT Pub. No.: WO2012/019414
PCT Pub. Date: Feb. 16, 2012

(65) Prior Publication Data
US 2013/0039233 A1    Feb. 14, 2013

(30) Foreign Application Priority Data
Aug. 9, 2010   (CN) .......................... 2010 1 0251674

(51) Int. Cl.
*H04W 24/10* (2009.01)
*H04W 72/00* (2009.01)
*H04W 88/02* (2009.01)
*H04W 88/08* (2009.01)

(52) U.S. Cl.
CPC .............. *H04W 24/10* (2013.01); *H04W 72/00* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 8,077,593 | B2 * | 12/2011 | Iwai et al. | ...................... 370/204 |
| 2009/0186613 | A1 | 7/2009 | Ahn et al. | |
| 2011/0085519 | A1 * | 4/2011 | Koivisto et al. | ............... 370/335 |

(Continued)

FOREIGN PATENT DOCUMENTS

| | | |
|---|---|---|
| CN | 101106395 | 1/2008 |
| CN | 101330325 | 12/2008 |

(Continued)

OTHER PUBLICATIONS

International Search Report for PCT/CN2010/080441, English translation attached to original, Both completed by the Chinese Patent Office on Apr. 10, 2011, All together 8 Pages.

*Primary Examiner* — Alex Skripnikov
(74) *Attorney, Agent, or Firm* — Brooks Kushman P.C.

(57) ABSTRACT

A radio frame and method are provided for sending a sounding reference signal (SRS) in a mobile communication system, which is used to solve the problem of shortage of resources for sending the SRS in the mobile communication system. The method includes a user equipment (UE) sending the SRS to eNB in time-frequency resources corresponding to a guard space in the radio frame, wherein the guard space is one or more of downlink to uplink guard space, uplink to downlink guard space, reserved subframes, or reserved idle resources. A device is also provided for sending the SRS, applied to the UE in the mobile communication system, wherein the device includes a radio frame construction module and a sounding reference signal transmission module.

11 Claims, 5 Drawing Sheets

(56) References Cited

U.S. PATENT DOCUMENTS

2011/0090862 A1 4/2011 Liang et al.
2011/0170462 A1 7/2011 Hao et al.

FOREIGN PATENT DOCUMENTS

CN 101378595 3/2009
WO WO 2009019879 A1 * 2/2009

* cited by examiner

RADIO FRAME AND SOUNDING REFERENCE SIGNAL SENDING METHOD IN MOBILE COMMUNICATION SYSTEM

CROSS-REFERENCE TO RELATED APPLICATION

This application is the U.S. national phase of PCT Appln. No. PCT/CN2010/080441 filed Dec. 29, 2010 which claims priority from Chinese Application No. 201010251674.0 filed Aug. 9, 2010, the disclosures of which are incorporated in their entirety by reference herein.

TECHNICAL FIELD

The present invention relates to the field of mobile communication technologies, and more especially, to a radio frame and a method for sending a Sounding Reference Signal (referred to as SRS) in a mobile communication system.

BACKGROUND OF THE RELATED ART

The radio frame in the Long Term Evolution (LTE) system comprises frame structures in the Frequency Division Duplex (FDD) mode and Time Division Duplex (TDD) mode. The frame structure in FDD mode is shown in FIG. 1, one 10 ms radio frame is composed of 20 time slots whose length is 0.5 ms and serial numbers are 0 to 19, and the time slots $2i$ and $2i+1$ constitutes a subframe i whose length is 1 ms. The frame structure in TDD mode is shown in FIG. 2, one 10 ms radio frame is composed of two half frames whose length is 5 ms, and one half-frame comprises 5 subframes whose length is 1 ms, and the subframe i is defined as two time slots $2i$ and $2i+1$ whose length is 0.5 ms.

In the aforementioned two frame structures, for the Normal Cyclic Prefix (Normal CP), one time slot contains 7 symbols whose length is 66.7 microseconds (μs), the CP length of the first symbol is 5.21 μs, and the CP length of the remaining six symbols is 4.69 μs; for the extended cyclic prefix (Extended CP), one time slot contains six symbols, the CP length of all symbols is 16.67 μs. The time unit $T_s$ is defined as $T_s=1/(15000 \times 2048)$ seconds, the supported uplink and downlink configuration is shown in the following Table 1, for each subframe in one radio frame, "D" denotes the subframe dedicated to the downlink transmission, "U" denotes the subframe dedicated to the uplink transmission, "S" denotes the special subframe used for three fields: the DwPTS (downlink pilot time slot), the Guard Period (GP) and the UpPTS (Uplink pilot time slot), and the lengths of the DwPTS and the UpPTS are shown in Table 2, their lengths conform to the total length of the three fields DwPTS, GP and UpPTS being $30720 \cdot T_s=1$ ms. Each subframe i is represented by the two time slots $2i$ and $2i+1$, and the length of each time slot is $T_{slot}=15360 \cdot T_s=0.5$ ms.

The LTE TDD supports the 5 ms and 10 ms uplink and downlink switching cycles. If the downlink to uplink transition point cycle is 5 ms, the special subframe exists in two half frames; if the downlink to uplink transition point cycle is 10 ms, the special subframe exists only in the first half frame. The subframe 0, the subframe 5 and the DwPTS are always used for downlink transmission. The UpPTS and the subframe next to the special subframe are dedicated to the uplink transmission.

TABLE 1

| UL/DL configuration | | | | | | | | | | | |
|---|---|---|---|---|---|---|---|---|---|---|---|
| UL/DL config-uration | Downlink-uplink transition point cycle | Subframe number | | | | | | | | | |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

TABLE 2

Special subframe configuration (DwPTS/GP/UpPTS length)

| | Normal cyclic prefix, downlink | | | Extended cyclic prefix, downlink | | |
|---|---|---|---|---|---|---|
| | | UpPTS | | | UpPTS | |
| Special subframe configuration | DwPTS | Normal cyclic prefix, uplink | Extended cyclic prefix, uplink | DwPTS | Normal cyclic prefix, uplink | Extended cyclic prefix, uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

In the LTE, the physical downlink control channel (PDCCH) is used to carry the uplink and downlink scheduling information as well as the uplink power control information. The downlink control information (referred to as DCI) format is classified as the DCI formats 0, 1, 1A, 1B, 1C, 1D, 2, 2A, 3, 3A and so on. The e-Node-B (referred to as eNB) can configure the User Equipment (referred to as UE) through the downlink control information, or the user equipment accepts the configuration of higher layers, also known as configuring the UE through higher-layer signaling.

The SRS (Sounding Reference Signal) is a signal used to measure the Channel State Information (referred to as CSI) between the user equipment and the eNB. In the Long Term Evolution system, the UE regularly sends the uplink SRS in the last data symbol of the transmitted subframe in accordance with the bandwidth, the frequency domain location, the sequence cyclic shift, the period, the subframe offset and other parameters indicated by the eNB. The eNB judges the uplink CSI of UE according to the received SRS and performs the frequency domain selection scheduling, the closed-loop power control and other operations according to the obtained CSI.

In the LTE system, the SRS sequence sent by the UE is obtained by performing cyclic shift α on one root sequence $\bar{r}_{u,v}(n)$ in the time domain. Different SRS sequences can be obtained by performing different cyclic shifts a on the same root sequence, and the obtained SRS sequences are orthogonal to each other, therefore, these SRS sequences can be allocated to different UEs to use, so as to achieve the CDMA between UEs. In the LTE system, the SRS sequence defines eight cyclic shifts a, given by the following formula (1):

$$\alpha = 2\pi \frac{n_{SRS}^{cs}}{8} \qquad \text{Equation (1)}$$

wherein, $n_{SRS}^{cs}$ is indicated by a 3 bit signaling, 0, 1, 2, 3, 4, 5, 6 and 7 respectively. In other words, in the same time-frequency resource, the UEs in the cell have 8 available code resources, and the eNB can configure up to eight UEs to send the SRS simultaneously in the same time-frequency resource. The equation (1) can be regarded as dividing the SRS sequence into eight portions with the same interval in the time domain, but since the length of the SRS sequence is a multiple of 12, the minimum length of the SRS sequence is 24.

In the LTE system, the SRS frequency domain bandwidth is configured with the tree structure. Each SRS bandwidth configuration corresponds to one tree structure, and the highest layer (or the first layer) SRS-Bandwidth corresponds to the maximum SRS bandwidth of that SRS bandwidth configuration, or called as the SRS bandwidth range. According to the eNB's signaling instruction, after the UE calculates to obtain its own SRS bandwidth, it determines the frequency domain initial position where the UE sends the SRS according to the upper-layer signaling frequency domain position $n_{RRC}$ sent by the eNB. FIG. 3 is a schematic diagram of the frequency domain initial position for the UEs with different allocated $n_{RRC}$ to send the SRS in the related art, as shown in FIG. 3, the UEs with different allocated $n_{RRC}$ sends the SRS in different regions of the cell SRS bandwidth, wherein the UE1 determines the frequency initial position of sending the SRS according to $n_{RRC}=0$, the UE2 determines the frequency initial position of sending the SRS according to $n_{RRC}=3$, the UE3 determines the frequency initial position of sending the SRS according to $n_{RRC}=4$, and the UE4 determines the frequency initial position of sending the SRS according to $n_{RRC}=6$.

The sequence used by the SRS is selected from the demodulation pilot sequence group, and when the SRS bandwidth of the UE has 4 Resource Blocks (referred to as RB), a Computer Generated (referred to as CG) sequence whose length is 2 RBs is used; when the SRS bandwidth of the UE is greater than 4 RBs, the Zadoff-Chu sequence with the corresponding length is used.

In addition, in the same SRS bandwidth, the SRS subcarriers are placed with a certain interval, that is, the SRS transmission uses the comb structure, and the number of frequency combs in the LTE system is 2, and the corresponding Repetition Factor (referred to as RPF) in the time domain is 2. FIG. 4 is a schematic diagram of the SRS comb structure in the related art, and as shown in FIG. 4, when each UE sends the SRS, it uses only one of the two frequency combs, comb=0 or comb=1. Therefore, the UE only uses the subcarriers whose frequency domain indexes are even or odd to send the SRS according to the instruction of the 1-bit upper-layer signaling. This comb-like structure allows more UEs to send the SRS in the same SRS bandwidth.

In the same SRS bandwidth, multiple UEs use different cyclic shifts in the same frequency comb, and then send the SRS through the code division multiplexing, or two UEs send the SRS through the frequency division multiplexing in the different frequency comb. For example, in the LTE system, there are 8 cyclic shifts and two frequency combs which can be used by the UEs to send the SRS in a certain SRS bandwidth (4 RBs), therefore, the UEs have 16 resources for sending the SRS in total, that is, in this SRS bandwidth, up to 16 SRSs can be sent at the same time. Since the uplink Single User Multiple Input Multiple Output (referred to as the SU-MIMO) is not supported in the LTE system, the UE can only have one antenna to send the SRS at each moment, therefore, one UE only requires one SRS resource, therefore in the aforementioned SRS bandwidth, the system can multiplex up to 16 UEs simultaneously.

The LTE-Advanced (referred to as LTE-A) system is a next generation evolved system of the LTE system, and it supports the SU-MIMO in the uplink and can use up to four antennas as the uplink transmitting antennas. That is, the UE can send the SRS with multiple antennas at the same time, and the eNB needs to estimate the state of each channel based on the SRS received by each antenna.

In the existing LTE-A research, it proposes that in the uplink communication, it should use the non-precoded (that is, antenna dedicated) SRS. At this point, when the UE uses multiple antennas to send the non-precoded SRS, the SRS resources needed by each UE will increase, causing the number of UEs that can be multiplexed in the system to decrease at the same time. In addition, besides of reserving the LTE's original SRS which is sent periodically, the downlink control information or the higher-layer signaling can also be used to configure the UE to send the SRS aperiodically.

For example, in a certain SRS bandwidth (4 RBs), if every UE uses four antennas to send the SRS, the number of resources needed by each UE is 4. The total number of SRS resources supported in one SRS bandwidth is 16, and then in this SRS bandwidth, the number of UEs that can be multiplexed is reduced to four. In the system, the number of users that can be multiplexed at the same time is ¼ of that in the original LTE.

Also, since it is proposed in the requirement of LTE-A that the number of users accommodated in the LTE-A system should not be less than that in the LTE system, thus this requirement contradicts the fact that the number of users decreases when sending the SRS with multiple antennas.

SUMMARY OF THE INVENTION

The technical problem to be solved in the present invention is to provide a method for sending a radio frame and a Sounding Reference Signal (referred to as SRS) in a mobile communication system to solve the problem that resources for sending the sounding reference signal are in shortage in the mobile communication system.

In order to solve the aforementioned problem, the present invention provides a method for sending a sounding reference signal in a mobile communication system, comprising:

a user equipment (UE) sending a sounding reference signal to an e-node-B (eNB) in time-frequency resources corresponding to a guard space in a radio frame, wherein, the guard space is one or more of a downlink to uplink guard space, a uplink to downlink guard space, reserved subframes, or reserved idle resources.

In a time division duplex system, the guard space is time-frequency resources corresponding to a guard period or an uplink pilot time slot of a special subframe, and the UE sends the sounding reference signal in the time-frequency resources corresponding to the guard period or uplink pilot time slot of the special subframe.

The last n orthogonal frequency division multiplexing (OFDM) symbols in the guard period are used for sending the sounding reference signal and n is 1, 2, 3, 4, 5 or 6.

Said uplink pilot time slot comprises two parts, the first part is adjacent to a general uplink subframe and is used to send the sounding reference signal or a physical random access channel (PRACH), and the second part is adjacent to said guard period and is used for sending the sounding reference signal.

In the time division duplex system, said guard period is an uplink time slot between the guard period and the uplink pilot time slot in the special subframe, and the uplink time slot is used to send the sounding reference signal.

When the sounding reference signal is sent in the uplink to downlink guard space, one or more of the first n OFDM symbols in the guard space are used for sending the sounding reference signal, wherein, a destination sounding reference signal is sent in one of the n OFDM symbols, and the value of n can be 0, 1, 2, 3, 4, 5 or 6.

When the sounding reference signal is sent in the uplink to downlink guard space, suppose that an original uplink timing advance amount is x, the uplink timing advance amount is increased to x+Offset, wherein the offset is one or more of the n OFDM symbols and a time length corresponding to one or more cyclic prefixes corresponding to the one or more OFDM symbols; and the value of n is 0, 1, 2, 3, 4, 5 or 6.

Said reserved idle resources can be a time slot, or a subframe, or m OFDM symbols, where m is a natural number; said sounding reference signal is sent in one or more of the n OFDM symbols of the reserved resources, n is 0, 1, 2, 3, 4, 5 or 6, and n is less than or equal to m.

The sounding reference signal is a periodic sounding reference signal and/or an aperiodic sounding reference signal.

In a frequency division duplex system, the UE uses the reserved idle resource in the radio frame as the guard space, the reserved resource is a reserved subframe, or one or more of the m OFDM symbols reserved in the subframe, or the uplink time slot reserved in the subframe, and m is 1, 2, 3, 4, 5 or 6.

The present invention also provides a radio frame for sending a sounding reference signal, comprising a special subframe composed of a downlink pilot time slot, a guard period and a uplink pilot time slot, wherein one or more of last n OFDM symbols of the guard period are used for sending the sounding reference signal, the value of n is 1, 2, 3, 4, 5 or 6.

One or more of said n OFDM are used to send the sounding reference signal.

The present invention also provides a radio frame for sending a sounding reference signal, comprising a special subframe composed of the downlink pilot time slot, the guard period and the uplink pilot time slot, wherein the uplink pilot time slot is composed of two parts, the first part is adjacent to a general uplink subframe and is used to send the sounding reference signal or the physical random access channel (PRACH), and the second part is adjacent to said guard period and is used for sending the sounding reference signal. The first part comprises one or two OFDM symbols, and the number of OFDM symbols comprised in the second part is any one or more values of 0, 1, 2, 3, 4, 5 or 6.

The present invention also provides a radio frame for sending the sounding reference signal, comprising a special subframe composed of the downlink pilot time slot, the guard period and the uplink pilot time slot, wherein the radio frame further comprises the uplink time slot between the guard period and the uplink pilot time slot, and the newly added uplink time slot is used for the sounding reference signal.

The present invention also provides a device for sending the sounding reference signal, applied to the UE in the mobile communication system, and said device comprises a radio frame construction module and a sounding reference signal transmission module, wherein: the radio frame construction module is configured to construct a radio frame as follows:

the radio frame comprises time-frequency resources corresponding to a guard space, and the guard space is one or more of a downlink to uplink guard space, an uplink to downlink guard space, a reserved subframe, or reserved idle resource;

said sounding reference signal transmission module is configured to send the sounding reference signal to an eNB in said mobile communication system in the time-frequency resources corresponding to the guard space in the radio frame.

Optionally, said device also has the following feature:

in a time division duplex system, said radio frame construction module is configured to construct the radio frame as follows: the time-frequency resources corresponding to the guard space of the radio frame are time-frequency resources corresponding to a guard period or an uplink pilot time slot of a special subframe;

said sounding reference signal transmission module is configured to send the sounding reference signal in the time-frequency resources corresponding to the guard period or the uplink pilot time slot of the special subframe.

Optionally, said device also has the following feature:

said radio frame construction module is configured to construct said radio frame as follows:

one or more of last n orthogonal frequency division multiplexing (OFDM) symbols of the guard period are used to send the sounding reference signal, wherein the n is 1, 2, 3, 4, 5 or 6.

Optionally, said device also has the following feature: said radio frame construction module is configured to construct the radio frame as follows:

said uplink pilot time slot comprises two parts, the first part is adjacent to a general uplink subframe and is used to transmit the sounding reference signal or the physical random access channel (PRACH), and the second part is adjacent to said guard period and is used to transmit the sounding reference signal.

Optionally, said device also has the following feature:

in the time division duplex system, said radio frame construction module is configured to construct the radio frame as follows: the time-frequency resources corresponding to the guard space are time-frequency resources corresponding to the uplink time slot between the guard period and the uplink pilot time slot in the special subframe;

said sounding reference signal transmission module is configured to send the sounding reference signal in the time-frequency resources corresponding to the uplink time slot.

Optionally, said device also has the following feature:

said radio frame construction module is configured to construct the radio frame as follows:

when the sounding reference signal is sent in the time-frequency resources corresponding to the uplink to downlink guard space, one or more of first n OFDM symbols of the time-frequency resources corresponding to the guard space are used to send the sounding reference signal, wherein a destination sounding reference signal is sent in one of the n OFDM symbols, and the value of n is 0, 1, 2, 3, 4, 5 or 6.

Optionally, said device also has the following feature:

in the frequency division duplex system, the radio frame construction module is configured to construct the radio frame as follows:

the corresponding time-frequency resource is the idle resource reserved in the radio frame, the reserved resource is the reserved subframe, or one or more of m OFDM symbols reserved in the subframe, or the uplink time slot reserved in the subframe, and m is 1, 2, 3, 4, 5 or 6.

The radio frame for sending the sounding reference signal and the method for sending the sounding reference signal in the present invention utilize the time-frequency resources corresponding to the guard space between the uplink and downlink subframes for sending the sounding reference signal, and the guard space can be the guard period or the uplink pilot time slot of a special subframe, or the reserved resources, which increases the number of resources used to send the sounding reference signal. Therefore, when guaranteeing the backward compatibility, the present invention also solves the problem that the number of users decreases when multiple antennas are used to send the SRS in the LTE-A system in the prior art, thus increasing the number of SRS resources available in the LTE-A system and improving the number of users accommodated in the LTE-A system.

PREFERRED EMBODIMENTS OF THE PRESENT INVENTION

Figure 1:
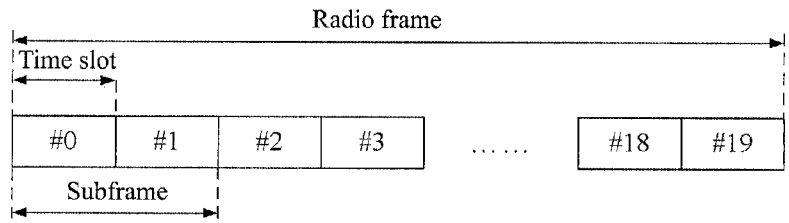
FIG. 1 is a schematic diagram of the frame structure in FDD mode in the related art.
Figure 2:
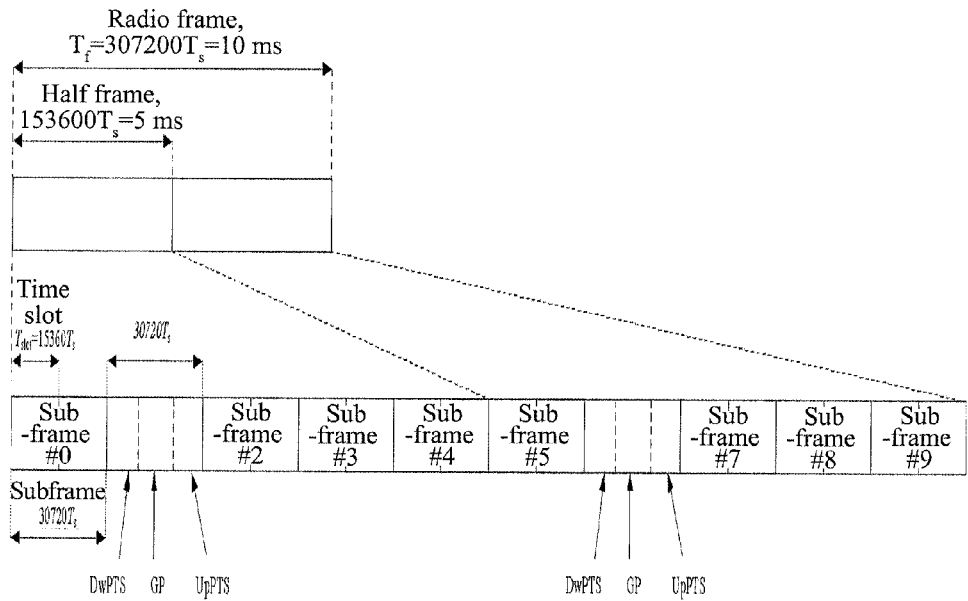
FIG. 2 is a schematic diagram of the frame structure in TDD mode in the related art.
Figure 3:
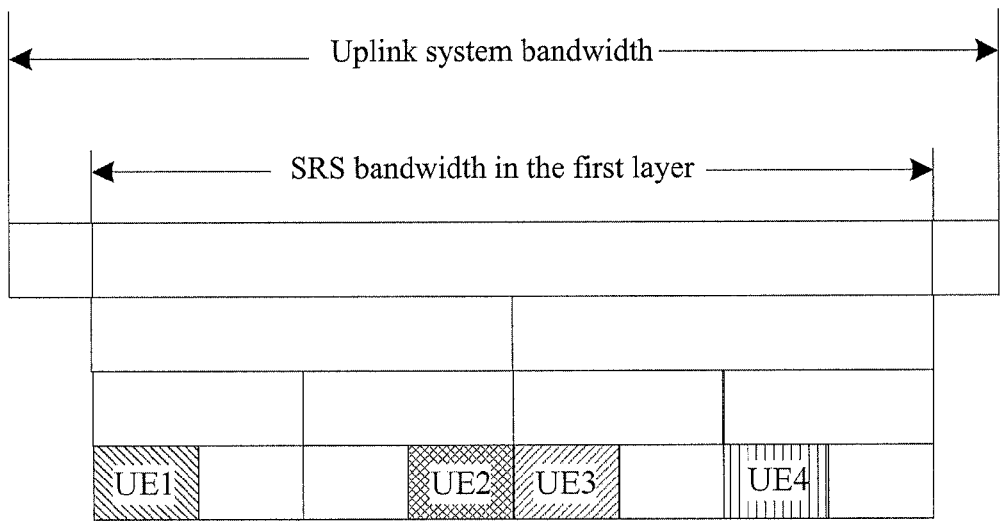
FIG. 3 is a schematic diagram of the frequency domain initial position where the UE with different allocated $n_{RRC}$ sends the SRS in the related art.
Figure 4:
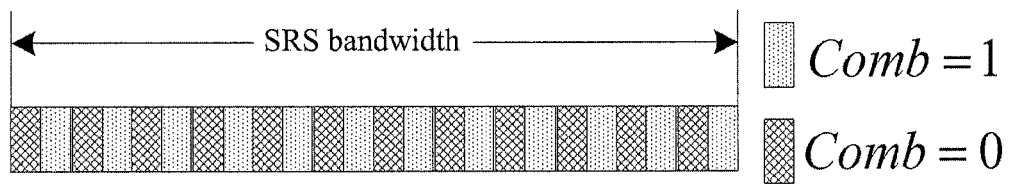
FIG. 4 is a schematic diagram of the SRS comb-like structure in the related art.

In order to make the purpose, the technical solution and benefits of the present invention clearer, the present invention will be described in further detail in the following with combination of the accompanying drawings.

In the embodiment of the present invention, the available SRS resources in the system are increased to solve the contradiction between a requirement of user capacity in the LTE-A and a decrease of the number of users when sending the SRS with multiple antennas.

The method for sending the sounding reference signal in the mobile communication system in the present invention, comprising:

the UE sends a sounding reference signal to the eNB in the time-frequency resources corresponding to the guard space in the radio frame, wherein the guard space is one or more of the downlink to uplink guard space, the uplink to downlink guard space, the reserved subframe, or the reserved idle resources.

In the TDD system, in the step of the UE sending the sounding reference signal to the eNB in the time-frequency resources corresponding to the guard space in the radio frame, the UE sends the sounding reference signal to the eNB in the time-frequency resources corresponding to the guard period of a special subframe in the radio frame. When the UE sends the sounding reference signal to the eNB in the time-frequency resources corresponding to the guard period of the special subframe in the radio frame, the UE uses one or more of the last n orthogonal frequency division multiplexing (OFDM) symbols of the guard period of the special subframe in the radio frame to send the sounding reference signal to the eNB, and the value of n is 1, 2, 3, 4, 5 or 6.

In the TDD system, in the step of the UE sending the sounding reference signal to the eNB in the time-frequency resources corresponding to the guard space in the radio frame, the UE sends the sounding reference signal in the time-frequency resources corresponding to the uplink pilot time slot (UpPTs) of the special subframe in the radio frame, and said UpPTs is includes two parts, the first part is adjacent to a general uplink subframe and is used to send the sounding reference signal or the physical random access channels (PRACH), and the second part is adjacent to said guard period and is used for sending the sounding reference signal.

The two parts of the UpPTs can be adjacent or not adjacent;

in the TDD system, in the step of the UE sending the sounding reference signal to the eNB in the time-frequency resources corresponding to the guard space in the radio frame, the UE sends the sounding reference signal to the eNB in the time-frequency resources corresponding to the newly added uplink time slot between the guard period (GP) and the uplink pilot time slot (UpPTs) in the special subframe in the radio frame.

The newly added uplink time slot can be adjacent to UpPTs or not adjacent to UpPTS;

the newly added uplink time slot can be adjacent to GP or not adjacent to GP;

when the sounding reference signal is sent in the time-frequency resources corresponding to the uplink to downlink guard space, one or more of the first n OFDM symbols of the time-frequency resources corresponding to the guard space are for sending the sounding reference signal, wherein, the destination sounding reference signal is sent in one of the n OFDM symbols, and the value of n is 0, 1, 2, 3, 4, 5 or 6.

When the sounding reference signal is sent in the time-frequency resources corresponding to the uplink to downlink guard space, suppose that the original uplink timing advance amount is x, then the new uplink timing advance amount is x+Offset, wherein the Offset is one or more of n OFDM symbols and the time length corresponding to one or more cyclic prefixes corresponding to one or more OFDM symbols; the value of n is 0, 1, 2, 3, 4, 5 or 6.

When the guard space is the reserved subframe or the reserved idle resource, when the sounding reference signal is sent in the reserved idle resource, the reserved idle resource contains n OFDM symbols, wherein, the destination sounding reference signal is sent in one of the n OFDM symbols. The reserved resource can be one slot, one subframe, or m OFDM symbols, and the m is a natural number. Said sounding reference signal can be sent in one or more of the n OFDM symbols of the reserved resource, and the n is 0, 1, 2, 3, 4, 5 or 6, and the n is less than or equal to m.

The number of the OFDM symbols contained in the guard space for sending the sounding reference signal is configured by the signaling; the index of the OFDM symbol for sending the destination sounding reference signal can be configured by the signaling; each OFDM symbol in the guard space for sending the sounding reference signal has one cyclic prefix, and the cyclic prefix is the same as the cyclic prefix used by the uplink subframe; the sounding reference signal can be a periodic or aperiodic sounding reference signal; preferably, one or more of the frequency domain transmission position, the used reference signal sequence, the sequence cyclic shift value and the frequency comb of the sounding reference signal are configured by signaling, or determined according to the predefined rules.

Figure 5:
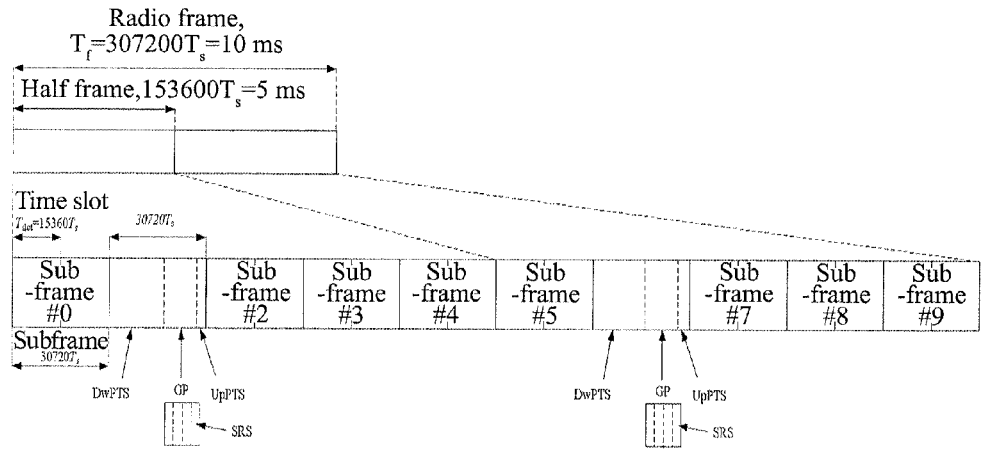
FIG. 5 is a schematic diagram of the time-domain position of sending the SRS in the guard period in accordance with the first embodiment.
Figure 8:
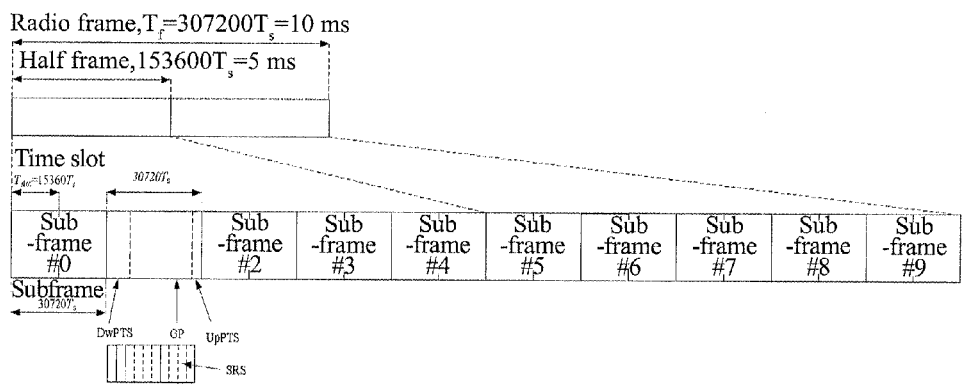
FIG. 8 is a schematic diagram of the time-domain position of sending the SRS in the guard period in accordance with the second embodiment.
Figure 11:
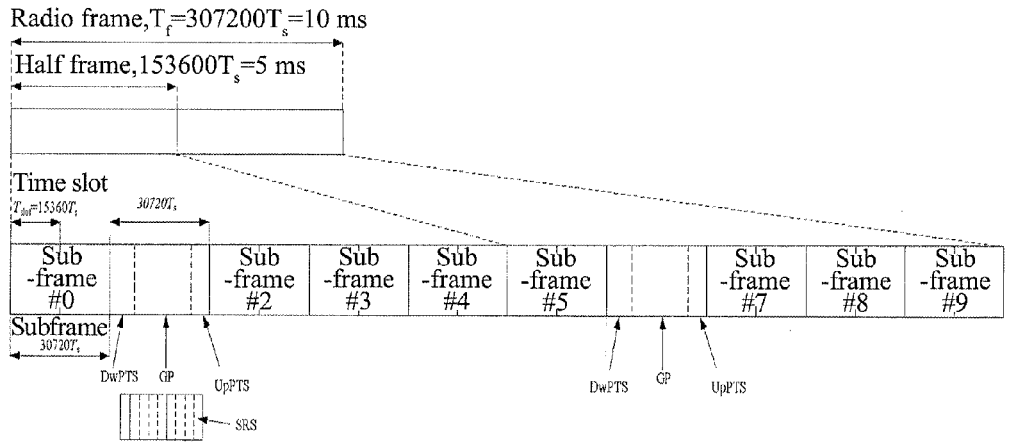
FIG. 11 is a schematic diagram of the time-domain position of sending the SRS in the guard period in accordance with the third embodiment.

In the time division duplex system, the frame structure of the radio frame for sending the sounding reference signal comprises three types:

first, the sounding reference signal is sent in the time-frequency resources corresponding to the guard period GP of the special subframe, and the special subframe is composed of the DwPTS, the GP and the UpPTS, and its specific structure can refer to FIGS. 5, 8 and 11, and the last n OFDM symbols of the guard period are used to send the sounding reference signal, wherein, the destination sounding reference signal is sent in one of the n OFDM symbols. The value of n is any one or more values of 1, 2, 3, 4, 5, or 6.

Figure 6:
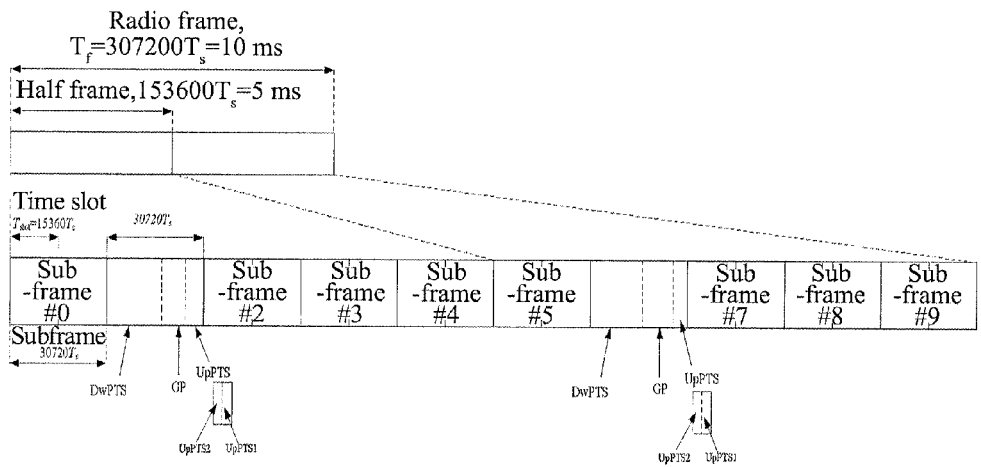
FIG. 6 is a schematic diagram of the time-domain position of sending the SRS in the UpPTS in accordance with the first embodiment.
Figure 9:
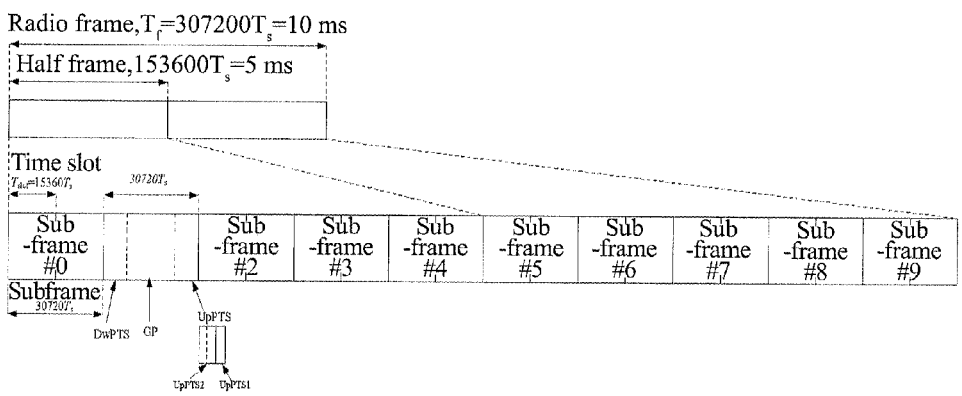
FIG. 9 is a schematic diagram of the time-domain position of sending the SRS in the UpPTS in accordance with the second embodiment.
Figure 12:
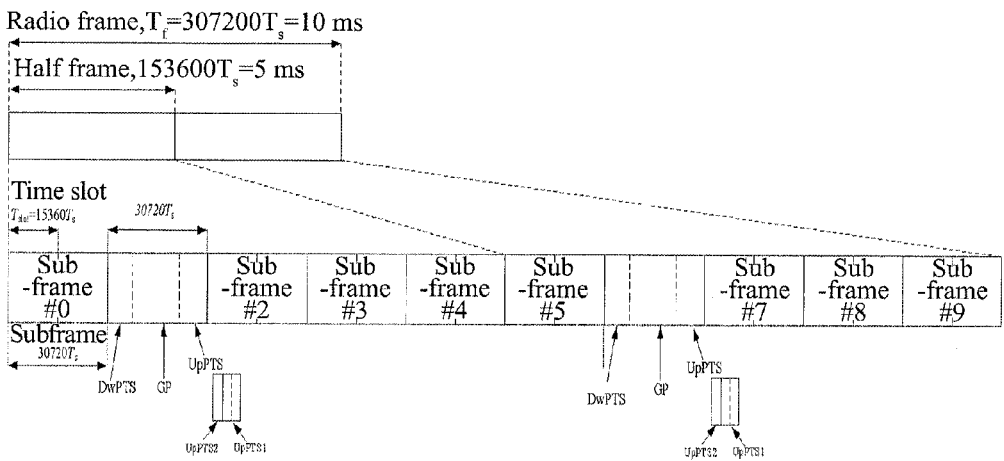
FIG. 12 is a schematic diagram of the time-domain position of sending the SRS in the UpPTS in accordance with the third embodiment.

Second, the sounding reference signal is sent in the uplink pilot time slot UpPTS of the special subframe, and the special subframe is composed of the DwPTS, the GP and the UpPTS, and its specific structure can refer to FIGS. 6, 9, 12, and the uplink pilot time slot UpPTS of the special subframe of the radio frame comprises two parts, UpPTS1 and UpPTS2. Preferably, the UpPTS1 is used to send the sounding reference signal or the PRACH, and the UpPTS2 is used to send the sounding reference signal; preferably, the UpPTS1 and the UpPTS2 also can be used to send the sounding reference signal, or one of them can be used to send the sounding reference signal.

Preferably, the UpPTS1 is next to the uplink subframe, and the UpPTS2 is next to the UpPTS1, wherein the number of OFDM symbols contained in the UpPTS1 is one or two OFDM symbols, the number of OFDM symbols contained in the UpPTS2 is 0, 1, 2, 3, 4, 5, 6. The sizes of the area of the UpPTS2 and the UpPTS1 are configured by the signaling; the UpPTS2 is visible for the new version of UE, and invisible for the old version of UE, and the new version of UE refers to a UE whose version is more than R8/9 version, and the old version of UE refers to the R8/9 version of UE.

The two parts UpPTS2 and UpPTS1 of the UpPts may not be adjacent;

third, a special uplink time slot UpPTS2 is added between the guard period in the special subframe and the uplink pilot time slot UpPTS, and the UpPTS2 is used to send the sounding reference signal. The special subframe is composed of the DwPTS, the GP and the UpPTS, and the specific structure can refer to FIGS. 7, 10 and 13.

For the third frame structure, further improvements can be made, the uplink special time slot UpPTS2 newly added in said radio frame can also be located in the general uplink subframe, or located in a location between uplink to the downlink transition and close to the uplink subframe; preferably, the UpPTS2 contains M OFDM symbols and M cyclic prefixes, wherein the value of M is configured by the signaling, and the value range of M can be any one or more values of 0, 1, 2, 3, 4, 5 and 6, and the cyclic prefix is the same as the cyclic prefix used in the uplink subframe.

When the special uplink time slot UpPTS2 is added between the guard period in the special subframe and the uplink pilot time slot UpPTS, and the UpPTS2 is used for sending the sounding reference signal, the UpPTS2 can be adjacent to the UpPTS or not adjacent to UpPTS, and the UpPTS2 can be adjacent to the guard period or not adjacent to the guard period;

in the time division duplex (TDD) system, besides that the time-frequency resource of the special subframe can be used to send the sounding reference signal, and the sounding reference signal can also be sent in the general uplink subframe, for example, an uplink time slot is added and set in the location where the last uplink subframe is adjacent to the downlink subframe in the radio frame, or the reserved uplink subframe or the OFDM symbol resources in the reserved uplink subframes are directly used to send the sounding reference signal.

In the frequency division duplex FDD system, the reserved resource in the radio frame can be used as the guard space, and the reserved resource can be the reserved subframe, or the reserved OFDM symbol in the subframe, or the reserved uplink time slot in the subframe.

For the aperiodic sounding reference signal appeared in the LTE-A system, part of the reserved resource which is used to send the periodic sounding reference signal is reserved and used to send the aperiodic sounding reference signal, and both the periodic sounding reference signal and the aperiodic sounding reference signal are code division multiplexed in the same time-frequency resource.

The First Embodiment

The application scenario of this embodiment is that in the time division duplex (TDD) system, the uplink-downlink configuration is set as 1 according to the configuration information shown in Table 1, and the special subframe configuration is set as 1 according to the configuration information shown in Table 2, and the downlink subframe uses the normal cyclic prefix, the uplink subframe uses the normal cyclic prefix, and the guard period (GP) can contain four OFDM symbols.

In this application scenario, the guard period GP can be used to send the sounding reference signal, or the uplink pilot time slot UpPTS can also be used to send the sounding reference signal, or one new special uplink time slot UpPTS2 can be added in the special subframe, and the newly added uplink time slot UpPTS2 is used to send the sounding reference signal.

As shown in FIG. 5, when the GP is used to send the sounding reference signal, the last one of four OFDM symbols of the guard period (GP) in the special subframe is used to send the sounding reference signal, and the cyclic prefix of the OFDM symbol is the normal cyclic prefix, the destination sounding reference signal is sent in the last OFDM symbol of the first guard period in the radio frame, or the destination sounding reference signal is sent in the last OFDM symbol of the second guard period in the radio frame.

As shown in FIG. 6, when the uplink pilot time slot UpPTS is used to send the sounding reference signal, the uplink pilot time slot UpPTS in the special subframe of the radio frame comprises two parts UpPTS1 and UpPTS2, wherein the UpPTS1 comprises one OFDM symbol, and the UpPTS2 comprises one OFDM symbol, and both the UpPTS1 and the UpPTS2 are used for sending the sounding reference signal; or only one of the UpPTS1 and UpPTS2 is used to send the signal.

Figure 7:
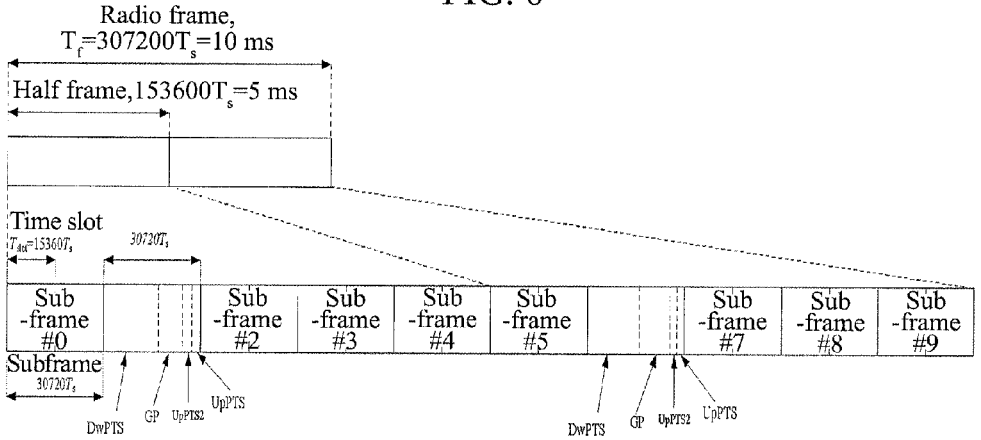
FIG. 7 is a schematic diagram of the time-domain position of sending the SRS in the UpPTS2 in accordance with the first embodiment.

As shown in FIG. 7, when the newly added uplink time slot UpPTS2 is used to send the sounding reference signal, one special uplink time slot UpPTS2 is newly added in the special subframe composed of the downlink pilot time slot, the guard period and the uplink pilot time slot, and the uplink time slot UpPTS2 is located between the guard period and the uplink pilot time slot UpPTS, and the UE can use the newly added uplink time slot UpPTS2 to send the sounding reference signal. This situation can be taken as a special case of the application shown in FIG. 6, that is, the UpPTS1 in FIG. 6 can be taken as the UpPTS, and the UpPTS2 can exist as a new special uplink time slot.

The Second Embodiment

The application scenario of this embodiment is that in the time division duplex (TDD) system, the uplink-downlink configuration is set as 3 according to the configuration information shown in Table 1, and the special subframe configuration is set as 0 according to the configuration information shown in Table 2, and the downlink subframe uses the normal cyclic prefix, the uplink subframe uses the normal cyclic prefix, and the guard period (GP) can contain 10 OFDM symbols, and in this scenario, the radio frame only has one guard period.

In the application scenario, the guard period GP can be used to send the sounding reference signal, or the uplink pilot time slot UpPTS can be used to send the sounding reference signal, or one new special uplink time slot UpPTS2 can be added in the special subframe, and the newly added uplink time slot UpPTS2 is used to send the sounding reference signal.

As shown in FIG. 8, when the GP is used to send the sounding reference signal, the last two of ten OFDM symbols of the guard period (GP) in the special subframe are used to send the sounding reference signal, and the cyclic prefix of the OFDM symbol is the normal cyclic prefix, and the destination sounding reference signal is sent in the second last OFDM symbol of the guard period in the radio frame.

Figure 10:
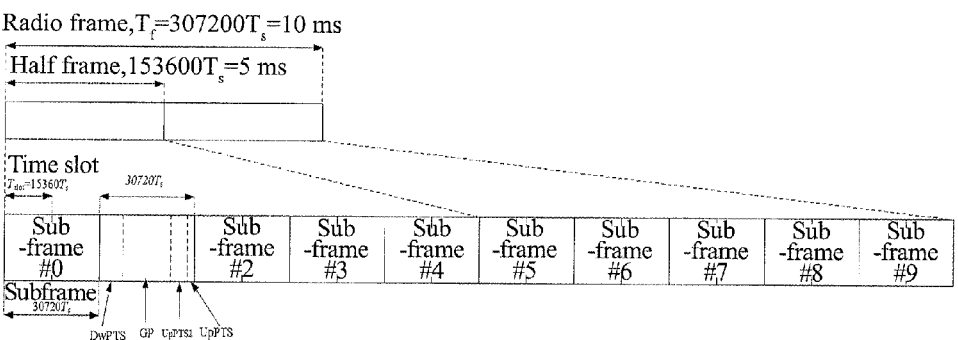
FIG. 10 is a schematic diagram of the time-domain position of sending the SRS in the UpPTS2 in accordance with the second embodiment.

As shown in FIG. 9, the uplink pilot time slot UpPTS is used to send the sounding reference signal, and in the frame structure of the radio frame, the uplink pilot time slot UpPTS in the special subframe comprises two parts UpPTS1 and UpPTS2, wherein the UpPTS1 comprises one OFDM symbol, and the UpPTS2 comprises two OFDM symbols, both the UpPTS1 and the UpPTS2 are used for sending the sounding reference signal; or only one of the UpPTS1 and the UpPTS2 is used to send the signal. The sizes of the UpPTS2 and the UpPTS1 are respectively configured by the signaling; the UpPTS1 is visible for any version of the UE, and the UpPTS2 is invisible for the R8/9 version of UE and visible for other versions of the UE;

as shown in FIG. 10, when the newly added uplink time slot UpPTS2 is used to send the sounding reference signal, one special uplink time slot UpPTS2 is newly added in the special subframe composed of the downlink pilot time slot, the guard period and the uplink pilot time slot, and the uplink time slot UpPTS2 is located between the guard period and the uplink pilot time slot UpPTS, and the UE can use the newly added uplink time slot UpPTS2 to send the sounding reference signal. In the application shown in FIG. 9, the UpPTS1 can be regarded as the UpPTS, and the UpPTS2 can exist as a new special uplink time slot and is used to send the sounding reference signal.

The Third Embodiment

The application scenario of this embodiment is that in the time division duplex (TDD) system, the uplink-downlink configuration is set as 6 according to the configuration information shown in Table 1, and the special subframe configuration is set as 5 according to the configuration information shown in Table 2, and the downlink subframe uses the normal cyclic prefix, the uplink subframe uses the normal cyclic prefix, and the guard period (GP) can contain nine OFDM symbols.

In this application scenario, the guard period GP can be used to send the sounding reference signal, or the uplink pilot time slot UpPTS can be used to send the sounding reference signal, or one new special uplink time slot UpPTS2 can be added in the special subframe, and the newly added uplink time slot UpPTS2 is used to send the sounding reference signal.

As shown in FIG. 11, when the GP is used to send the sounding reference signal, the last OFDM symbol of the guard period (GP) in the special subframe is used to send the sounding reference signal, and the cyclic prefix of the OFDM symbol is the normal cyclic prefix, the destination sounding reference signal is sent in the last OFDM symbol of the first guard period in the radio frame.

As shown in FIG. 12, when the uplink pilot time slot UpPTS is used to send the sounding reference signal, the uplink pilot time slot UpPTS in the special subframe of the radio frame comprises two parts UpPTS1 and UpPTS2, wherein the UpPTS1 comprises two OFDM symbols, and the UpPTS2 comprises one OFDM symbol, the UpPTS1 is used to send the sounding reference signal or the PRACH, and the UpPTS2 is used to send the sounding reference signal; or one of the UpPTS1 and the UpPTS2 is used to send the sounding reference signal. The sizes of the UpPTS1 and the UpPTS2 can be configured by the signaling.

Figure 13:
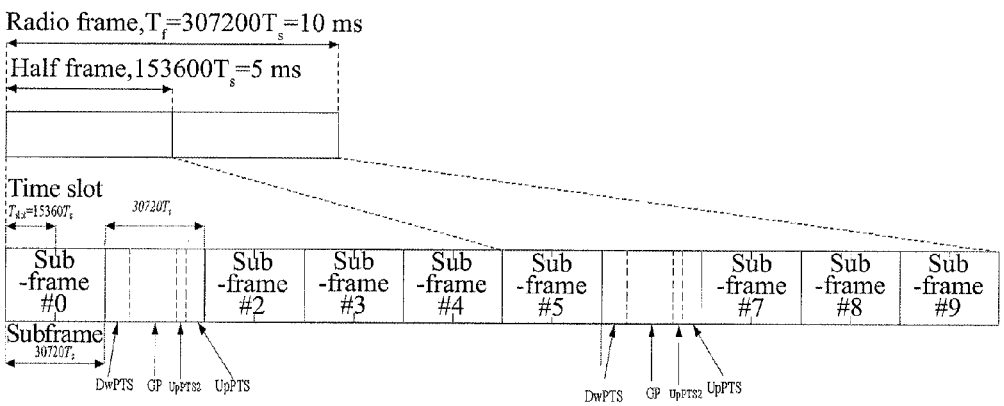
FIG. 13 is a schematic diagram of the time-domain position of sending the SRS in the UpPTS2 in accordance with the third embodiment.

As shown in FIG. 13, when the newly added uplink time slot UpPTS2 is used to send the sounding reference signal, one special uplink time slot UpPTS2 is newly added in the special subframe composed of the downlink pilot time slot, the guard period and the uplink pilot time slot, and the uplink time slot UpPTS2 is located between the guard period and the uplink pilot time slot UpPTS, and the UE can use the newly added uplink time slot UpPTS2 to send the sounding reference signal. This situation can be taken as a special case of the application shown in FIG. 12, that is, the UpPTS1 in FIG. 12 can be taken as the UpPTS, and the UpPTS2 can exist as a new special uplink time slot and is used to send the sounding reference signal.

The Fourth Embodiment

The application scenario of this embodiment is that in the time division duplex (TDD) system, the uplink-downlink configuration is set as 3 according to the configuration information shown in Table 1, and the special subframe configuration is set as 0 according to the configuration information shown in Table 2, and the downlink subframe uses the normal cyclic prefix, and the uplink subframe uses the normal cyclic prefix, and the last uplink subframe in the radio frame in the configuration condition is adjacent to the downlink subframe, and x time lengths are advanced through the uplink timing, so the guard space can be generated between the uplink and the downlink for the uplink to downlink switching.

This guard space is used to isolate the uplink from the downlink, when x+Offset time lengths are advanced by uplink timing, wherein the offset is the time length of two OFDM symbols and two normal cyclic prefixes, and since x+Offset time lengths are advanced by the uplink transmission timing, the downlink transmission remains unchanged, leading to a guard space generated between the last uplink subframe and the downlink subframe, and the guard space is used for transmitting the sounding reference signal; at this point, the first two OFDM symbols of the generated uplink to downlink guard space can be used to transmit the sounding reference signal, the destination sounding reference signal is sent in the first OFDM symbol of the guard space of the uplink to downlink switching, and the first OFDM symbol is next to the last OFDM symbol in the last uplink subframe.

The Fifth Embodiment

The application scenario of this embodiment is that in the frequency division duplex (TDD) system, and one reserved uplink subframe is used to send the sounding reference signal. The downlink subframe uses the normal cyclic prefix, and the uplink subframe uses the normal cyclic prefix, referring to the frame structure shown in the FIG. 1, the uplink subframe 7 is a reserved subframe and can be used to transmit the sounding reference signal, and the destination sounding reference signal is sent in the first OFDM symbol of the uplink subframe 7.

The Sixth Embodiment

In the related art, only the last OFDM symbol of part of the uplink subframes is used to transmit the sounding reference signal. For the LTE-A system, in the technical solution of the present invention, new resources are reserved in the uplink subframe for sending the sounding reference signal, that is, the reserved resources in the uplink subframe are used to send the sounding reference signal, for example, the reserved resources in the subframe can be the first OFDM symbol of the subframe, or the last OFDM symbol of the first time slot of the subframe, or the first OFDM symbol of the second time slot of the subframe.

In the related art, there is only the periodic sounding reference signal, in the new version system, such as the LTE-A, the aperiodic sounding reference signal is introduced. In the technical solution of the present invention, part of the resources reserved and used to send the periodic sounding reference signal can be considered to be reserved for the aperiodic sounding reference signal, for example, both the periodic sounding reference signal and the aperiodic sounding reference signal can be code division multiplexed in the same time-frequency resource.

In summary, by the aforementioned embodiment of the present invention, the guard space and the reserved resources are used to send the sounding reference signal to guarantee the backward compatibility, and meanwhile, the problem is solved that the number of users decreases when sending the SRS with multiple antennas in the LTE-A system in the prior art, increasing the number of SRS resources available in the LTE-A system, improving the number of users accommodated in the LTE-A system.

Obviously, those skilled in the field should understand that each module or step of the present invention can be achieved with a general-purpose computing device, and they can be integrated on a single computing device, or distributed in a network composed of multiple computing devices, optionally, they can be achieved with program code executed by the computing device, therefore, they can be stored in the storage device and executed by the computing device, and in some cases, the shown and described steps are executed in an order different from the one herein, or they can be made into various integrated circuit modules, or multiple modules or steps can be made into a single integrated circuit module for implementation. Therefore, the present invention is not limited to any particular hardware and software combination.

INDUSTRIAL APPLICABILITY

The radio frame and the method for sending the sounding reference signal in the mobile communication system provided in the present invention use the guard space and the reserved resources to send the sounding reference signal, when guaranteeing the backward compatibility, the problem that the number of uses decreases when sending the SRS with multiple antennas in the LTE-A system in the prior art can be solved, thus increasing the number of available SRS resources in the LTE-A system, increasing the number of users that can be accommodated in the LTE-A system and solving the problem of the shortage of resources for sending the sounding reference signal in the mobile communication system.

Each module or step of the present invention can be achieved with a general-purpose computing device, and they can be integrated on a single computing device or distributed in a network composed of multiple computing devices, optionally, they can be achieved with program code executed by the computing device, therefore, they can be stored in the storage device and executed by the computing device, and in some cases, the shown and described steps are executed in an order different from the one herein, or they can be made into various integrated circuit modules, or multiple modules or steps can be made into a single integrated circuit module for implementation.

Therefore, the present invention can be implemented and applied in any particular hardware and software combination and it has industrial practicability.

What is claimed is:

1. A method for sending a sounding reference signal in a mobile communication system, comprising:
   a user equipment UE sending the sounding reference signal to an e-node-B, eNB in time-frequency resources corresponding to a guard space in a radio frame, wherein the guard space is one or more of a downlink-to-uplink guard space, an uplink-to-downlink guard space, reserved subframes, or reserved idle resources;
   wherein when the sounding reference signal is sent in the time-frequency resources corresponding to the uplinkto-downlink guard space, the sounding reference signal is sent in one or more of first n OFDM symbols of the time-frequency resources corresponding to the guard space, wherein, a destination sounding reference signal is sent in one of the n OFDM symbols, and the value of n is 1, 2, 3, 4, 5 or 6;

when the sounding reference signal is sent in the time-frequency resources corresponding to the uplink to downlink guard space, an original uplink timing advance amount is increased by Offset, wherein the Offset is one or more OFDM symbols of n OFDM symbols and a time length corresponding to one or more cyclic prefixes corresponding to the one or more OFDM symbols; and the value of n is 0, 1, 2, 3, 4, 5 or 6;

in a time division duplex system, in the step of the UE sending the sounding reference signal to the eNB in the time-frequency resources corresponding to the guard space in the radio frame, the UE sending the sounding reference signal to the eNB in time-frequency resources corresponding to a guard period or an uplink pilot time slot of a special subframe in the radio frame;

in a time division duplex system, in the step of the UE sending the sounding reference signal to the eNB in the time-frequency resources corresponding to the guard space in the radio frame, the UE sending the sounding reference signal to the eNB in time-frequency resources corresponding to an uplink time slot between an uplink pilot time slot and a guard period of a special subframe in the radio frame.

2. The method of claim 1, wherein,
when the UE sends the sounding reference signal to the eNB in the time-frequency resources corresponding to the guard period of the special subframe in the radio frame, the UE uses one or more of last n orthogonal frequency division multiplexing OFDM symbols of the guard period of the special subframe in the radio frame to send the sounding reference signal to the eNB, and the value of n is 1, 2, 3, 4, 5 or 6.

3. The method of claim 1, wherein,
the uplink pilot time slot comprises two parts, first part is adjacent to a general uplink subframe and is for sending the sounding reference signal or a physical random access channel PRACH, and second part is adjacent to the guard period and is for sending the sounding reference signal.

4. The method of claim 1, wherein,
the reserved idle resources can be a time slot, or a subframe, or m OFDM symbols, wherein the m is a natural number;
the sounding reference signal is sent in one or more of n OFDM symbols of the reserved idle resources, and the n is 0, 1, 2, 3, 4, 5 or 6, and the n is less than or equal to m.

5. The method of claim 1, wherein,
the sounding reference signal is at least one of a periodic sounding reference signal and an aperiodic sounding reference signal.

6. The method of claim 1, wherein, in a frequency division duplex system,
in the step of the UE sending the sounding reference signal to the eNB in the time-frequency resources corresponding to the guard space in the radio frame, the UE sends the sounding reference signal to the eNB in the reserved idle resources in the radio frame, and the reserved idle resources are the reserved subframes, or one or more of m OFDM symbols reserved in a subframe, or an uplink time slot reserved in the subframe, and m is 1, 2, 3, 4, 5 or 6.

7. A device for sending a sounding reference signal, applied to a user equipment UE in a mobile communication system, comprising a radio frame construction module and a sounding reference signal transmission module, wherein:
the radio frame construction module is configured to construct a radio frame as follows:
the radio frame comprising time-frequency resources corresponding to a guard space, and the guard space being one or more of a downlink-to-uplink guard space, an uplink-to-downlink guard space, reserved subframes, or reserved idle resources;
the sounding reference signal transmission module is configured to send the sounding reference signal to an e-node-B, eNB of the mobile communication system in the time-frequency resources corresponding to the guard space in the radio frame;
wherein, in a time division duplex system,
the radio frame construction module is configured to construct the radio frame as follows: the time-frequency resources corresponding to the guard space of the radio frame being time-frequency resources corresponding to a guard period or an uplink pilot time slot of a special subframe;
the sounding reference signal transmission module is configured to send the sounding reference signal in the time-frequency resources corresponding to the guard period or the uplink pilot time slot of the special subframe;
wherein the radio frame construction module is configured to construct the radio frame as follows:
the uplink pilot time slot comprising two parts, first part being adjacent to a general uplink subframe and being for sending the sounding reference signal or a physical random access channel PRACH, and second part being adjacent to the guard period and being for sending the sounding reference signal.

8. The device of claim 7, wherein, the radio frame construction module is configured to construct the radio frame as follows:
one or more of last n orthogonal frequency division multiplexing OFDM symbols of the guard period being for sending the sounding reference signal, wherein the n is 1, 2, 3, 4, 5 or 6.

9. The device of claim 7, wherein, in a time division duplex system,
the radio frame construction module is configured to construct the radio frame as follows: the time-frequency resources corresponding to the guard space being time-frequency resources corresponding to an uplink time slot between a guard period and an uplink pilot time slot in a special subframe;
the sounding reference signal transmission module is configured to send the sounding reference signal in the time-frequency resources corresponding to the uplink time slot.

10. The device of claim 7, wherein, the radio frame construction module is configured to construct the radio frame as follows:
when the sounding reference signal is sent in the time-frequency resources corresponding to the uplink-to-downlink guard space, one or more of first n OFDM symbols of the time-frequency resources corresponding to the guard space being for sending the sounding reference signal, wherein a destination sounding reference signal is sent in one of the n OFDM symbols, and the value of n is 0, 1, 2, 3, 4, 5 or 6.

11. The device of claim 7, wherein, in a frequency division duplex system, the radio frame construction module is configured to construct the radio frame as follows:

corresponding time-frequency resources being the reserved idle resources in the radio frame, the reserved resources being the reserved subframes, or one or more of m OFDM symbols reserved in a subframe, or an uplink time slot reserved in the subframe, and m being 1, 2, 3, 4, 5 or 6.

* * * * *